United States Patent
Kobayashi

(10) Patent No.: US 12,234,903 B2
(45) Date of Patent: Feb. 25, 2025

(54) STRAIN WAVE GEARING AND ACTUATOR

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/576,392

(22) PCT Filed: Sep. 21, 2021

(86) PCT No.: PCT/JP2021/034641
§ 371 (c)(1),
(2) Date: Jan. 4, 2024

(87) PCT Pub. No.: WO2023/047469
PCT Pub. Date: Mar. 30, 2023

(65) Prior Publication Data
US 2024/0309945 A1   Sep. 19, 2024

(51) Int. Cl.
*F16H 49/00* (2006.01)
*F16H 57/02* (2012.01)
*G01L 5/12* (2006.01)

(52) U.S. Cl.
CPC .......... *F16H 49/001* (2013.01); *F16H 57/02* (2013.01); *G01L 5/12* (2013.01); *F16H 2049/003* (2013.01)

(58) Field of Classification Search
CPC .. F16H 49/001; F16H 57/02; F16H 2049/003; G01L 5/12
See application file for complete search history.

(56) References Cited

U.S. PATENT DOCUMENTS 3,087,330 A * 4/1963 Metzmeier ............ F16C 17/24
73/862.49
2007/0199405 A1   8/2007 Kobayashi
(Continued)

FOREIGN PATENT DOCUMENTS

JP    H0415518 B2    1/1992
JP    2007231996 A    9/2007
(Continued)

OTHER PUBLICATIONS

International Search Report (PCT/ISA/210) with translation and Written Opinion (PCT/ISA/237) mailed on Nov. 9, 2021, by the Japanese Patent Office as the International Searching Authority for International Application No. PCT/JP2021/034641. (12 pages).

*Primary Examiner* — Terence Boes
(74) *Attorney, Agent, or Firm* — Buchanan Ingersoll & Rooney PC

(57) ABSTRACT

In the interior of a device housing of a strain wave gearing, a detection mechanism is incorporated at a site on the outer peripheral side of a hub of a wave generator. The hub of the wave generator is linked to a motor shaft so that axial force does not act thereon. The detection mechanism detects minute displacements in the axial direction that occur in the hub of the wave generator due to thrust acting on the wave generator. Thrust acting on the wave generator is obtained on the basis of the detected minute displacements. With this strain wave gearing in which the detection mechanism is incorporated, operation control that is responsive to sensed thrust is possible through the use of thrust information during operation.

17 Claims, 6 Drawing Sheets

(56) References Cited

U.S. PATENT DOCUMENTS

2017/0126905 A1    5/2017  Ishizaki et al.
2020/0235636 A1    7/2020  Miyazawa

FOREIGN PATENT DOCUMENTS

| | | | | |
|---|---|---|---|---|
| JP | 2011236629 | A | 11/2011 | |
| JP | 2011240488 | A | 12/2011 | |
| JP | 2017083311 | A | 5/2017 | |
| JP | 2019105314 | A | 6/2019 | |
| JP | 2020200845 | A | 12/2020 | |
| WO | 02076813 | A1 | 10/2002 | |
| WO | 2018159032 | A1 | 9/2018 | |
| WO | WO-2023026488 | A1 * | 3/2023 | ........... F16H 49/001 |

* cited by examiner

STRAIN WAVE GEARING AND ACTUATOR

TECHNICAL FIELD

The present invention relates to a strain wave gearing provided with a mechanism for detecting thrust, and to an actuator.

BACKGROUND ART

In strain wave gearings, thrust in a direction toward a reduced-rotation output side acts on a wave generator during a reduction in speed, and thrust in the opposite direction acts on the wave generator during an increase in speed. In Patent Document 1, the inventor of the present patent application proposed a method for reducing input-side retention torque required in order to retain a wave generator so as not to rotate due to load-side torque in a cup-shaped or top-hat-shaped strain wave gearing. In this method, input-side retention torque is reduced using a difference between the direction of thrust acting on the wave generator during a reduction in speed and that during an increase in speed in a strain wave gearing provided with a flexible externally toothed gear.

"Pancake-shaped" or "flat" strain wave gearings are also known. Strain wave gearings of such configuration comprise two internally toothed gears, a cylindrical flexible externally toothed gear that is coaxially disposed inside the internally toothed gears, and a wave generator that is coaxially mounted inside the externally toothed gear. One of the internally toothed gears is a fixed-side (stationary-side) gear that has a different number of teeth than the externally toothed gear, and the other internally toothed gear is an output-side (drive-side) gear that has the same number of teeth as the externally toothed gear and rotates integrally therewith. During reduced-speed operation, if high-speed rotation is inputted from a motor or the like to the wave generator, the rotation of the wave generator is greatly reduced in accordance with the difference between the number of teeth of the fixed-side internally toothed gear and that of the externally toothed gear, and the externally toothed gear rotates at a reduced rate. The reduced rotation is outputted from the output-side internally toothed gear, which rotates integrally with the externally toothed gear, to a load side. Conversely, during increased-speed operation, rotation inputted from the output-side internally toothed gear is greatly increased between the externally toothed gear and the fixed-side internally toothed gear, and high-speed rotation is outputted from the wave generator. The strain wave gearing disclosed in Patent Document 2 is provided with a restricting member that restricts movement of an externally toothed gear caused by thrust produced between the externally toothed gear and the wave generator.

PRIOR-ART DOCUMENT

Patent Document

Patent Document 1: JP 2007-231996 A
Patent Document 2: JP 2019-105314 A

SUMMARY OF THE INVENTION

Problems to be Solved by the Invention

In strain wave gearings, no proposals have been made for small detectors that can be built into the strain wave gearing and that detect thrust generated during reduced-speed operation and during increased-speed operation. If there was a small detector that could be built in, it would be possible to perform operation control that corresponds to the detected thrust, using information pertaining to thrust during operation.

In view of these matters, it is an object of the present invention to provide: a strain wave gearing provided with a small, built-in mechanism for detecting thrust; and an actuator provided with said strain wave gearing.

Means of Solving the Problems

A strain wave gearing according to the present invention is characterized by comprising:
  a rigid internally toothed gear;
  a flexible externally toothed gear that is disposed inside the internally toothed gear;
  a wave generator that is disposed inside the externally toothed gear, the wave generator causing the externally toothed gear to flex into a non-circular shape and partially mesh with the internally toothed gear;
  a device housing that rotatably supports the wave generator; and
  a detection mechanism that, in order to detect thrust generated between the wave generator and the externally toothed gear, detects displacement produced in the wave generator in the direction of an axis by the thrust,
  the wave generator being provided with a hub that is linked to an external rotating shaft so as to rotate integrally with the rotating shaft while being capable of moving relatively in the direction of the axis,
  the device housing being provided with a cylindrical housing portion that surrounds the hub, and
  the detection mechanism being disposed between the hub and the cylindrical housing and detecting displacement of the hub in the direction of the axis.

Only rotational force is transmitted from the exterior to the wave generator of the strain wave gearing; axial force is not transmitted. Thrust that is generated between the wave generator and the externally toothed gear acts on the wave generator as axial force. Due to the thrust acting on the wave generator, a miniscule degree of displacement is produced in the hub of the wave generator in the direction of the axis. The miniscule degree of displacement is detected by the detection mechanism. The thrust acting on the wave generator is calculated on the basis of the detected miniscule degree of displacement.

Additionally, because the detection mechanism is disposed in a space formed between the hub of the wave generator and a site on the device housing that surrounds the hub, the detection mechanism can be incorporated into the strain wave gearing without any associated increase in the axial length of the strain wave gearing.

Furthermore, in the strain wave gearing in which the detection mechanism is incorporated, and in an actuator comprising the aforementioned strain wave gearing and a motor, it is possible to perform operation control that corresponds to the thrust using information pertaining to thrust during operation.

MODE FOR CARRYING OUT THE INVENTION

Embodiments of a strain wave gearing to which the present invention is applied are described below with reference to the accompanying drawings. The embodiments described below are examples of the present invention; the present invention is not intended to be limited to the embodiments.

(Overall Configuration)

Figure 1A:
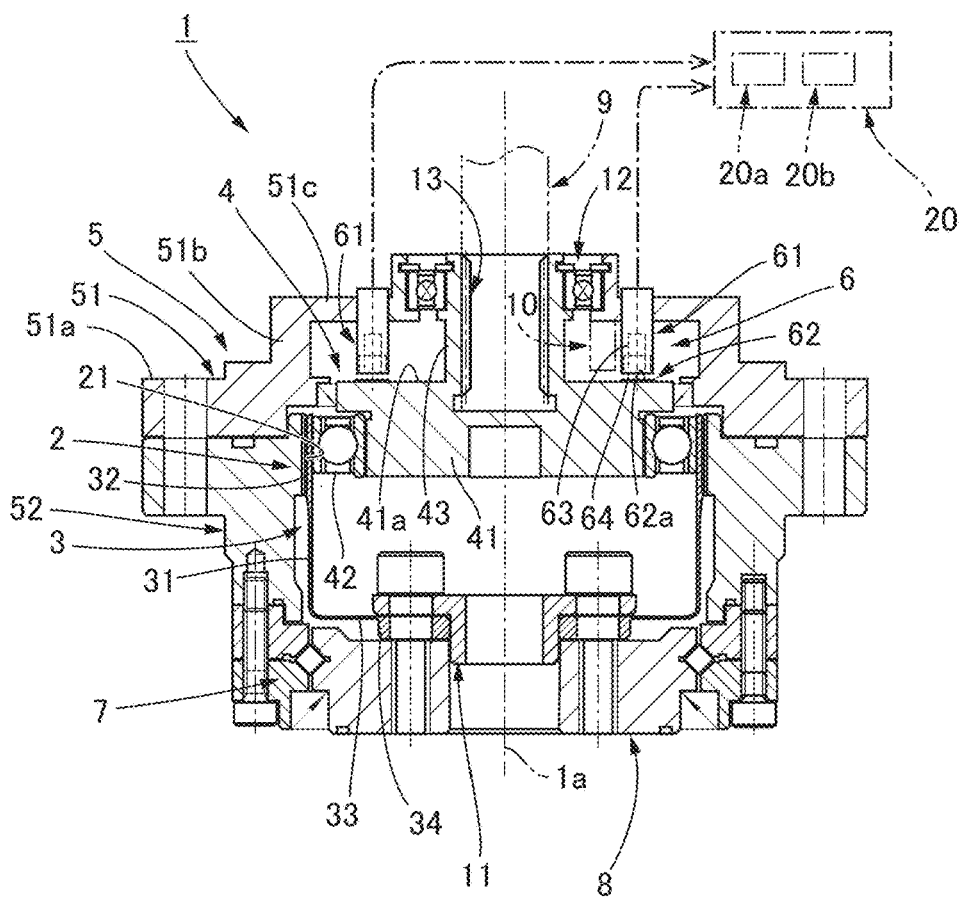
FIG. 1A is a diagram showing one example of a cup-shaped strain wave gearing to which the present invention is applied.
Figure 1B:
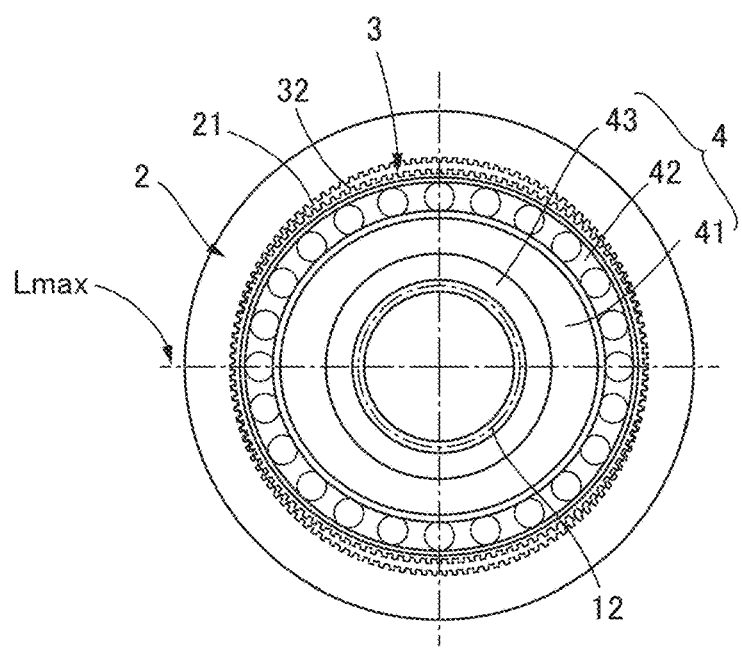
FIG. 1B is a diagram showing a state of meshing of an externally toothed gear with an internally toothed gear in the strain wave gearing.

The present invention shall now be described with reference to FIGS. 1A and 1B. A cup-shaped strain wave gearing 1 to which the present invention is applied has a rigid internally toothed gear 2, a flexible cup-shaped externally toothed gear 3 that is coaxially disposed inside the internally toothed gear 2, a wave generator 4 that is coaxially mounted inside the externally toothed gear 3, a device housing 5, and a detection mechanism 6 that is incorporated inside the device housing 5. The detection mechanism 6 detects a miniscule degree of displacement produced in the wave generator 4 in the direction of an axis 1a, the miniscule degree of displacement being caused by thrust generated between the externally toothed gear 3 and the wave generator 4. A detection result from the detection mechanism 6 is supplied to a drive control device 20 either by wire or wirelessly.

The drive control device 20 is mainly configured from a computer and is provided with an operation state determination unit 20a and an operation control unit 20b. The operation state determination unit 20a calculates whether or not thrust acting on the wave generator 4 has been generated, the direction of the thrust, the magnitude of the thrust, any change over time in the thrust, and other such information on the basis of the detection result from the detection mechanism 6. The operation state determination unit 20a also determines the operation state of the strain wave gearing 1 on the basis of the calculated information pertaining to the thrust. The operation control unit 20b controls the operation state of the strain wave gearing 1 on the basis of the determination result pertaining to the operation state.

The device housing 5 is provided with a cylindrical input-side housing 51, and a cylindrical output-side housing 52 that is securely fixed in a coaxial manner to one end of the input-side housing 51. The input-side housing 51 is provided with a large-diameter attachment flange 51a, a cylindrical housing portion 51b that protrudes coaxially from the end surface of the attachment flange 51a, and an end plate portion 51c that closes off the end of the cylindrical housing portion 51b. An output shaft 8 is rotatably supported via a cross roller bearing 7 on an output-side end part of the output-side housing 52.

The internally toothed gear 2 is a fixed-side member. In the present example, the internally toothed gear 2 is formed integrally with the inner peripheral surface of the output-side housing 52 of the device housing 5. The wave generator 4 is an input-side member to which high-speed rotation is inputted, the wave generator 4 being coaxially linked to a motor shaft 9 as indicated by the phantom lines. The externally toothed gear 3 is an output-side member that outputs reduced rotation, the disc-shaped output shaft 8 being coaxially linked to the externally toothed gear 3.

The externally toothed gear 3 is provided with a cylindrical barrel part 31 that is capable of flexing in a radial direction, external teeth 32 that are formed on the open-end-side outer peripheral surface portion of the cylindrical barrel part 31, a diaphragm 33 that extends radially inward from the opposite-side end of the cylindrical barrel part 31, and an annular rigid boss 34 that is connected to the inner peripheral edge of the diaphragm 33. The externally toothed gear 3 is coaxially mounted inside the internally toothed gear 2, and the external teeth 32 face internal teeth 21 of the internally toothed gear 2 from the radially inner side. The boss 34 is sandwiched between an annular pressing member 11 and the output shaft 8, these three members being securely fastened by a plurality of fastening bolts.

The wave generator 4 is provided with a rigid wave plug 41 that is provided with an ellipsoidal outer peripheral surface, and a wave bearing 42 that is mounted on the ellipsoidal outer peripheral surface of the wave plug 41. The wave bearing 42 is mounted between the ellipsoidal outer peripheral surface of the wave plug 41 and an inner peripheral surface of the cylindrical barrel part 31 of the externally toothed gear 3, the wave bearing 42 retaining the wave plug 41 and the externally toothed gear 3 in a state allowing relative rotation. The portion of the cylindrical barrel part 31 where the external teeth 32 are formed on the externally toothed gear 3 is caused to flex into an ellipsoidal shape by the wave bearing 42, which is mounted on the wave plug 41 and is caused to flex into an ellipsoidal shape. The external teeth 32 that are positioned at both end portions on a long axis Lmax of the ellipsoidal shape mesh with the internal teeth 21 of the internally toothed gear 2.

A cylindrical hub 43 is integrally formed in a coaxial state with one plug end surface 41a (input-side plug end surface) of the wave plug 41 in the direction of the axis 1a. A distal-end part of the hub 43 is rotatably supported via a bearing 12 on an inner peripheral edge part of a central opening section in the end plate portion 51c of the input-side housing 51. The hub 43 is also attached to the input-side housing 51 via the bearing 12 so as not to move in the direction of the axis 1a relative to the input-side housing 51.

The motor shaft 9 indicated by the phantom lines is inserted into a central shaft hole in the hub 43 from a distal-end opening therein and is coaxially linked to the hub 43. The hub 43 and the motor shaft 9 are linked via, e.g., a splined part 13. The hub 43 and the motor shaft 9 rotate integrally but are also capable of sliding relative to one another in the direction of the axis 1a. Thus, substantially no axial-direction force is transmitted between the motor shaft 9 and the wave generator 4; only rotational force is transmitted between these members.

(Detection Mechanism)

The detection mechanism 6 detects a miniscule degree of axial-direction displacement that is generated in the hub 43 of the wave plug 41 in the wave generator 4. The detection mechanism 6 is incorporated between the hub 43 and the input-side housing 51 of the device housing 5, which surrounds the hub 43.

The detection mechanism 6 in the present example is a laser length-measuring detection mechanism provided with a detection unit 61 that emits and receives laser light, and a reflection part 62 that is provided with a reflective surface 62a for reflecting the laser light. The detection unit 61 is provided with a laser light source 63 that emits the laser light toward the reflective surface 62a, and a light-receiving part 64 that receives the laser light reflected by the reflective surface 62a. In laser length-measuring detection mechanisms, as is well known, distances are accurately measured through triangulation, phase-difference ranging, or the like.

The detection unit 61 is attached to the end plate portion 51c of the input-side housing 51. The reflection part 62 is attached to the plug end surface 41a of the wave plug 41, which faces the end plate portion 51c from the direction of the axis 1a. The reflective surface 62a of the reflection part 62 is formed in a constant-width ring shape that coaxially surrounds the hub 43. In the present example, the reflective surface 62a is orthogonal to the axis 1a, and the detection unit 61 faces the reflective surface 62a from a direction following the axis 1a. Additionally, in the present example, a pair of detection units 61 are disposed at symmetrical angular positions that are offset by 180 degrees in the circumferential direction of the reflective surface 62a, the angular positions being centered on the axis 1a. It is also possible to dispose three or more detection units 61 to raise detection accuracy.

(Description of Operation)

In the strain wave gearing 1 having this configuration, when the wave generator 4 is caused to rotate at high speed by the motor shaft 9, the positions where the externally toothed gear 3 meshes with the internally toothed gear 2 move in the circumferential direction of the internally toothed gear 2. The externally toothed gear 3 has 2n fewer teeth than the internally toothed gear 2 (n being a positive integer). In the present example, because the internally toothed gear 2 is fixed, the externally toothed gear 3 rotates at a reduced speed in association with rotation of the wave generator 4. The reduced rotation of the externally toothed gear 3 is outputted to a load side (not shown) from the output shaft 8, which is linked to the boss 34.

The motor shaft 9 and the hub 43 of the wave generator 4 are linked via the splined part 13, the motor shaft 9 and the hub 43 rotating integrally with one another while being capable of moving relatively in the direction of the axis 1a. Only rotational force is transmitted from the external motor shaft 9 to the wave generator 4; axial force is not transmitted. Thrust generated between the externally toothed gear 3 and the wave generator 4 acts on the wave plug 41, with which the hub 43 is integrally formed.

The hub 43 of the wave plug 41 of the wave generator 4 is supported via the bearing 12 by the input-side housing 51 of the fixed-side device housing 5 so as not to move in the direction of the axis 1a. When thrust acts on the wave generator 4, a miniscule degree of displacement is produced in the hub 43 of the wave plug 41 in the direction of the axis 1a. The position of the reflective surface 62a on the wave-plug 41 side is displaced to a miniscule degree in the direction of the axis 1a relative to the light-receiving part 64 of the detection unit 61 in accordance with the miniscule degree of displacement of the hub 43. The extent of the miniscule degree of displacement is measured by the detection mechanism 6.

The detection result from the detection mechanism 6 (i.e., the measured extent of the miniscule degree of displacement) is supplied to the drive control device 20 either by wire or wirelessly. The operation state determination unit 20a of the drive control device 20 determines or calculates whether or not thrust has been generated, the direction of the thrust, the magnitude of the thrust, any change over time in the thrust, and other such information on the basis of the detection result from the detection mechanism 6. The operation control unit 20b performs operation control for the strain wave gearing 1 on the basis of the detection result from the detection mechanism 6 or the determination result from the operation state determination unit 20a.

It is possible to raise the detection accuracy by correcting the temperature of the detection mechanism 6. In this case, for example, a temperature sensor 10 is disposed near the plug end surface 41a of the wave plug 41 or the outer peripheral surface of the hub 43, as indicated by the phantom lines in FIG. 1A. The output from the temperature sensor 10 is fed to the drive control device 20, and the detection result is subjected to temperature correction. The temperature sensor can be disposed to carry out temperature correction in the examples that shall be described later as well.

(Another Example of Attaching Detection Mechanism)

Figure 2:
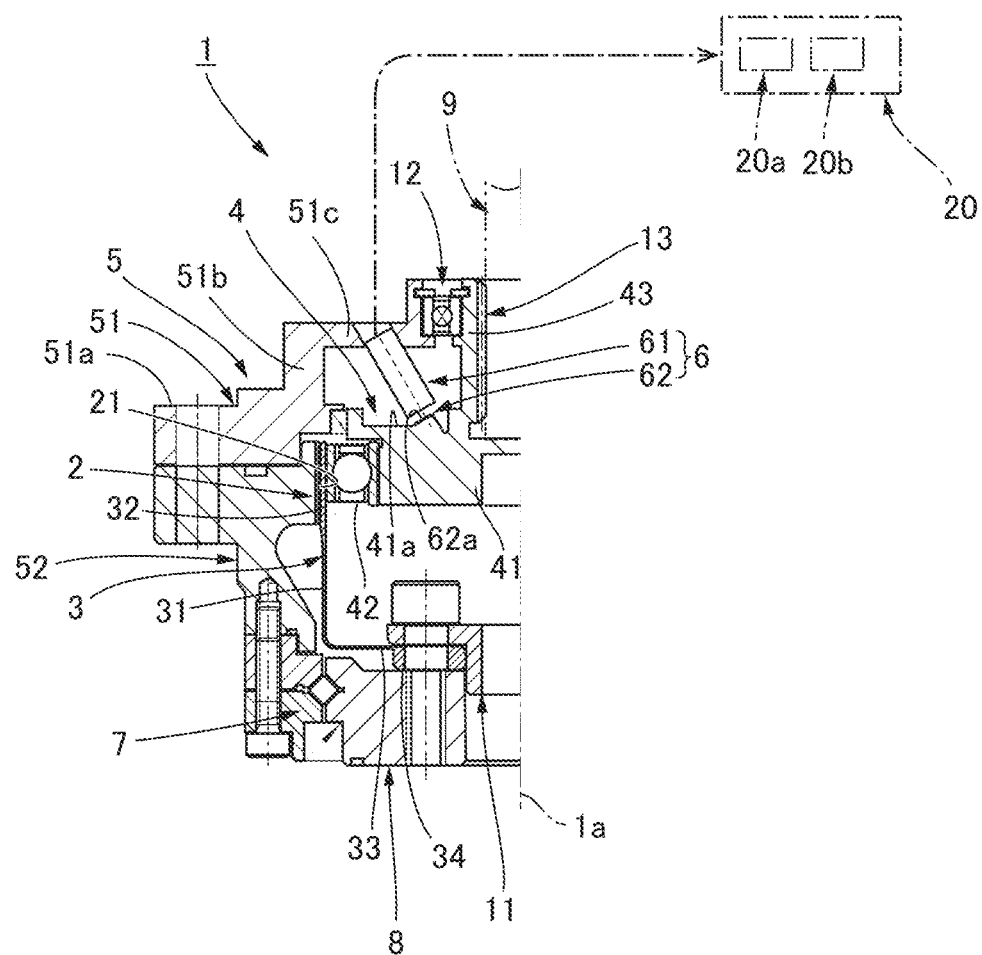
FIG. 2 is a diagram showing a half longitudinal cross-section of the strain wave gearing, the diagram showing another example of attachment of a detection mechanism.

FIG. 2 includes a half longitudinal cross-section of the strain wave gearing 1 and shows another example of attachment of the detection mechanism 6 incorporated into the strain wave gearing 1. The detection unit 61 of the detection mechanism 6 shown in FIG. 2 is attached to the input-side housing 51 so as to be inclined by an angle of less than 90 degrees relative to the axis 1a. The reflective surface 62a of the reflection part 62, which is disposed on the plug end surface 41a of the wave plug 41, is also inclined relative to the axis 1a in correspondence with the orientation of the laser light emitted from the detection unit 61. Thus, it is possible to dispose the detection mechanism 6 so as to be inclined relative to the axis 1a.

(Actuator)

Figure 3:
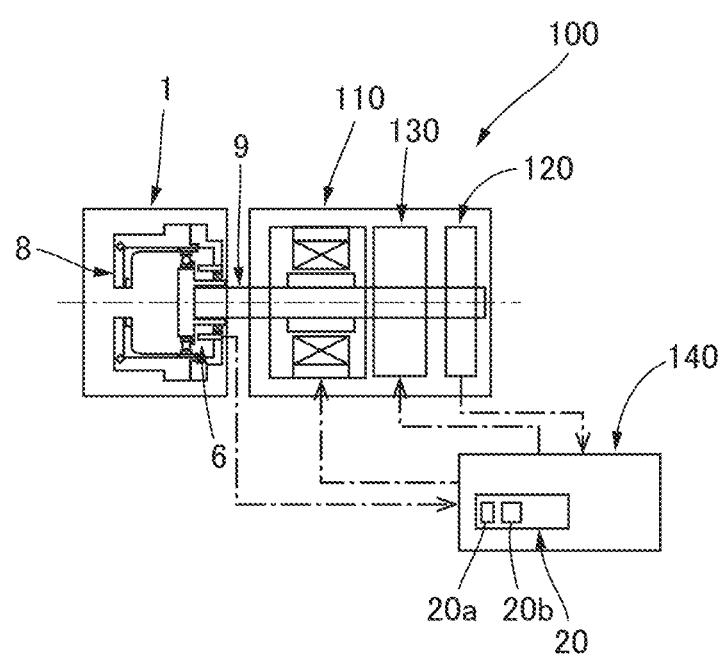
FIG. 3 is a diagram showing one example of an actuator comprising the strain wave gearing.

FIG. 3 shows one example of an actuator (rotary actuator) in which the strain wave gearing 1 of the present example is used. As shown in FIG. 3, an actuator 100 is configured from: a motor 110; the strain wave gearing 1, which reduces and outputs motor output rotation; a rotation detection mechanism 120 and a brake mechanism 130 that are incorporated into the motor 110; and a control device 140. The control device 140 is provided with the functions of the previously described operating state determination unit 20a and operation control unit 20b.

The control device 140 derives the thrust from the detected miniscule degree of displacement of the wave generator 4. The control device 140 also controls driving of the motor 110 and the brake mechanism 130 and controls the rotation inputted to the strain wave gearing 1 (wave generator 4) on the basis of the thrust, thereby making it possible to perform operation control for the strain wave gearing 1.

For example, the operating state is determined and operation control for the strain wave gearing 1 is performed as follows.

(1) Whether the strain wave gearing 1 is in a reduced-speed operation state or an increased-speed operation state is determined according to detection of the direction of thrust. During increased-speed operation, efficiency can be reduced and torque for retaining the motor 110 can be reduced by friction torque from the brake mechanism 130 or the like.

(2) The following states can be determined on the basis of whether or not thrust is being generated. Thrust is not generated if the wave generator 4 and the motor shaft 9, which is linked to the wave generator 4, are completely locked. Thus, it is possible to determine whether locking force on a designated shaft is excessive or insufficient when action is stopped.

When other shafts such as those of a multi-shaft robot are in action, and when the designated shaft is not sufficiently locked by the strain wave gearing 1, increased-speed operation is performed and thrust is generated. Thus, insufficient locking force can be addressed by increasing the locking force on the designated shaft when action is stopped, using the brake mechanism 130 or the like.

(3) The magnitude and variation of the thrust are greatly affected by load torque and the state of lubrication between the inner peripheral surface of the externally toothed gear 3 and the outer peripheral surface of an outer race of the wave generator 4. The state of lubrication between the inner peripheral surface of the externally toothed gear 3 and the outer peripheral surface of the outer race of the wave bearing 4 can be ascertained on the basis of the magnitude and variation of the thrust.

The state of lubrication varies depending on the operating orientation and operating state (one-way constant continuous operation, high-load low-speed operation, short cycle and high acceleration rate in forward and reverse, long stop time, type and state of lubricant) of the strain wave gearing 1. Service life can be predicted and diagnosed on the basis of the state of lubrication.

If it is found that the state of lubrication has worsened, the state of lubrication can be restored to a favorable state. For example, it is possible to, inter alia, reduce the load torque, reduce the acceleration rate, or set an appropriate rotation speed and operating time.

Additional Embodiments (Example of Optical Detection Mechanism)

Figure 4A:
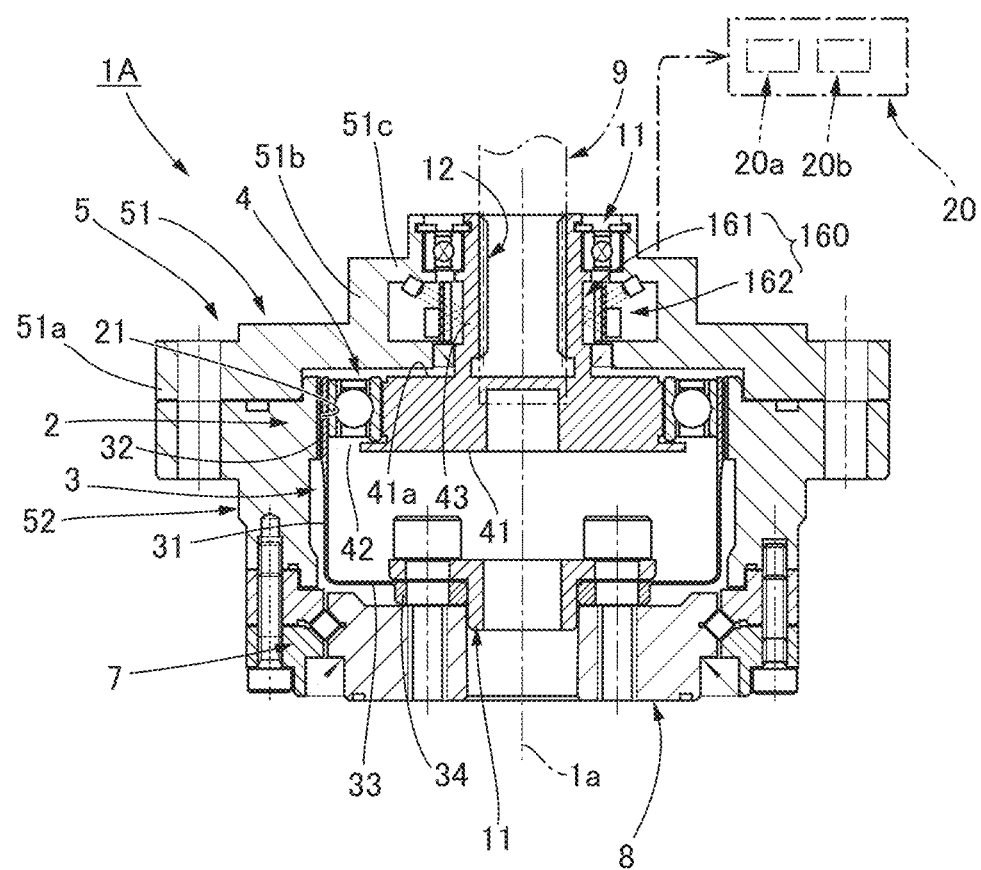
FIG. 4A is a diagram showing another example of a strain wave gearing to which the present invention is applied.
Figure 4B:
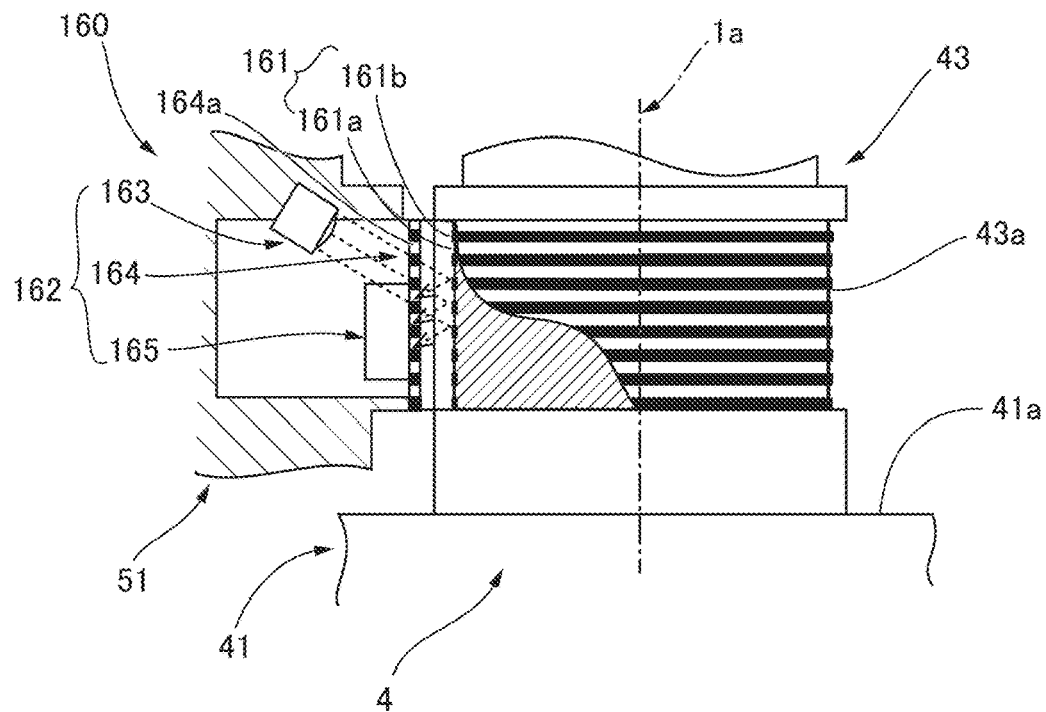
FIG. 4B is a diagram showing an optical detection mechanism.

FIG. 4A includes a longitudinal cross-section of a strain wave gearing into which a different type of detection mechanism is incorporated, and FIG. 4B shows a portion of said detection mechanism. A strain wave gearing 1A has the same configuration as the strain wave gearing 1; therefore, corresponding parts are denoted by the same reference numerals, and descriptions of these parts are omitted.

A detection mechanism 160 that is incorporated into the strain wave gearing 1A is an optical detection mechanism provided with: a detection pattern 161 that can be optically detected, the detection pattern 161 being disposed on an outer peripheral surface 43a of the hub 43 of the wave plug 41; and an optical detection unit 162 that is attached to the input-side housing 51 of the device housing 5.

The detection pattern 161 disposed on the outer peripheral surface 43a of the hub 43 is capable of expanding and contracting in a manner that follows displacement of a hub outer peripheral part in the direction of the axis 1a. The detection pattern 161 in the present example includes constant-width light-reflective parts 161a and non-reflective parts 161b that are formed alternatingly at regular intervals along the direction of the axis 1a; for example, the detection pattern 161 is formed over the entire circumference of the outer peripheral surface 43a of the hub 43.

The detection unit 162 is provided with a light-emitting part 163, a fixed slit plate 164, and a light-receiving part 165. The light-emitting part 163 emits detection light toward the detection pattern 161 via fixed slits 164a, which are light-transmitting parts formed in the fixed slit plate 164. The fixed slits 164a are constant-width slits that are also arranged at regular intervals along the direction of the axis 1a. The light-receiving part 165 receives reflected light, which is the detection light reflected by the detection pattern 161, via the fixed slits 164a in the fixed slit plate 164.

When thrust acts on the wave plug 41 of the wave generator 4 and the hub 43 of the wave plug 41 is displaced to a miniscule degree in the direction of the axis 1a, the detection pattern 161 expands or contracts in the direction of the axis 1a so as to follow the miniscule degree of displacement. As a result, the amount of reflected light that is received by the light-receiving part 165 changes in accordance with the miniscule degree of displacement of the hub 43. Storing and retaining these correspondence relationships in advance allows the magnitude, direction, and other features of the thrust to be derived on the basis of the detected amount of received light.

The detection unit 162 can be disposed at a plurality of positions in the circumferential direction of the outer peripheral surface 43a of the hub 43. For example, a pair of detection units 162 can be disposed at symmetrical angular positions that are offset by 180 degrees centered on the axis 1a. This makes it possible to raise the detection accuracy. It is possible to use a detection unit provided with a ring-shaped light-emitting part and a ring-shaped light-receiving part that coaxially surround the detection pattern 161 as the detection unit 162. It is also possible to dispose three or more detection units 162.

The optically detectable detection pattern 161 can be formed directly on the outer peripheral surface 43a of the hub 43 through surface processing, printing, or the like. A flexible film or the like on which the detection pattern 161 is formed or printed may be affixed to the outer peripheral surface 43a of the hub 43.

(Example of Magnetic Detection Mechanism)

Figure 4C:
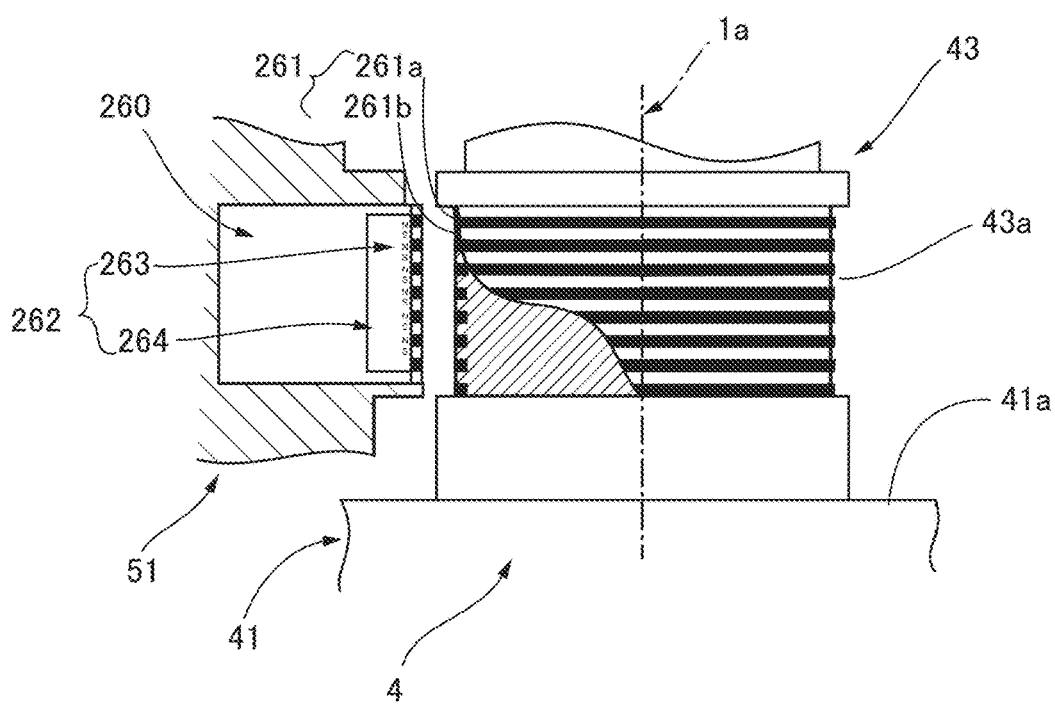
FIG. 4C is a diagram showing a magnetic detection mechanism.

It is also possible to use a magnetic detection mechanism as the detection mechanism. FIG. 4C shows one example of a magnetic detection mechanism. The detection mechanism shall now be described with reference to FIG. 4C. A magnetic detection mechanism 260 that is incorporated into the strain wave gearing 1A (refer to FIG. 4A) is provided with: a detection pattern 261 that can be magnetically detected, the detection pattern 261 being disposed on the outer peripheral surface 43a of the hub 43 of the wave plug 41; and a magnetic detection unit 262 that is attached to the input-side housing 51 of the device housing 5.

The detection pattern 261 disposed on the outer peripheral surface 43a of the hub 43 is capable of expanding and contracting in a manner that follows displacement of the hub outer peripheral part in the direction of the axis 1a. The detection pattern 261 in the present example includes constant-width magnetic parts 261a and non-magnetic parts 261b that are formed alternatingly at regular intervals along the direction of the axis 1a; the detection pattern 261 is formed over the entire circumference of the outer peripheral surface 43a of the hub 43. For example, magnetic loop bands that are formed by applying a metal-based magnetic powder or the like to the outer peripheral surface 43a of the hub 43 at a constant width are arranged at regular intervals in the direction of the axis 1a, whereby the detection pattern 261 is obtained.

The magnetic loop bands may be formed directly on the outer peripheral surface 43a of the hub 43 through surface processing. For example, the outer peripheral surface 43a of the hub 43, which is composed of austenitic stainless steel, is subjected to a shot-peening process in which residual austenite that is non-magnetic and is likely to plastically deform is transformed into martensite, and the processed surface is polished and finished, whereby magnetic parts are formed at constant intervals in the direction of the axis. A flexible film or the like on which the detection pattern 261, which is composed of magnetic media, is printed may be affixed to the outer peripheral surface 43*a* of the hub 43.

The detection unit 262 is provided with magnets 263 that face the detection pattern 261 such that the intensity of a magnetic field changes in association with expansion and contraction of the detection pattern 261 in the direction of the axis 1*a*, and an MR element or other magnetic detection element 264 that detects any change in the intensity of the magnetic field. Constant-width N poles and S poles are formed on the magnets 263 at regular intervals along the direction of the axis 1*a*.

The magnetic detection unit 262 also can be disposed at a plurality of positions in the circumferential direction of the outer peripheral surface 43*a* of the hub 43. For example, a pair of detection units 262 can be disposed at symmetrical angular positions that are offset by 180 degrees centered on the axis 1*a*. This makes it possible to raise the detection accuracy. It is possible to use a detection unit provided with a ring-shaped magnet and a ring-shaped magnetic detection element that coaxially surround the detection pattern 261 as the detection unit 262. It is also possible to dispose three or more detection units.

(Other Examples of Strain Wave Gearing)

The example described above is a case in which the present invention is applied to a cup-shaped strain wave gearing. The present invention can also be applied to top-hat-shaped strain wave gearings and pancake-shaped strain wave gearings.

Figure 5:
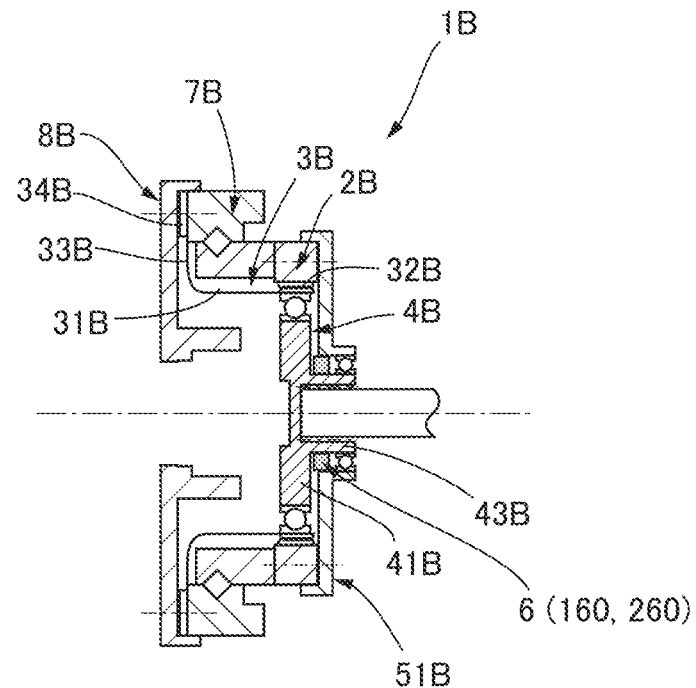
FIG. 5 is a diagram showing an example of a top-hat-shaped strain wave gearing to which the present invention is applied.

FIG. 5 shows a top-hat-shaped strain wave gearing 1B into which a detection mechanism 6 is incorporated. The top-hat-shaped strain wave gearing 1B comprises a rigid internally toothed gear 2B, a top-hat-shaped externally toothed gear 3B, a wave generator 4B, and an input-side housing 51B (device housing). The top-hat-shaped externally toothed gear 3B is provided with a cylindrical barrel part 31B, external teeth 32B that are formed on the outer peripheral surface of the cylindrical barrel part 31B, a diaphragm 33B that spreads radially outward from one end of the cylindrical barrel part 31B, and an annular rigid boss 34B that is formed on the outer peripheral edge of the diaphragm 33B.

A disc-shaped output shaft 8B and an outer race of a cross roller bearing 7B are coaxially fixed to the boss 34B. A detection mechanism 6 (160, 260) is incorporated between a hub 43B of a wave plug 41B of the wave generator 4B and the input-side housing 51B, which surrounds the hub 43B.

Figure 6:
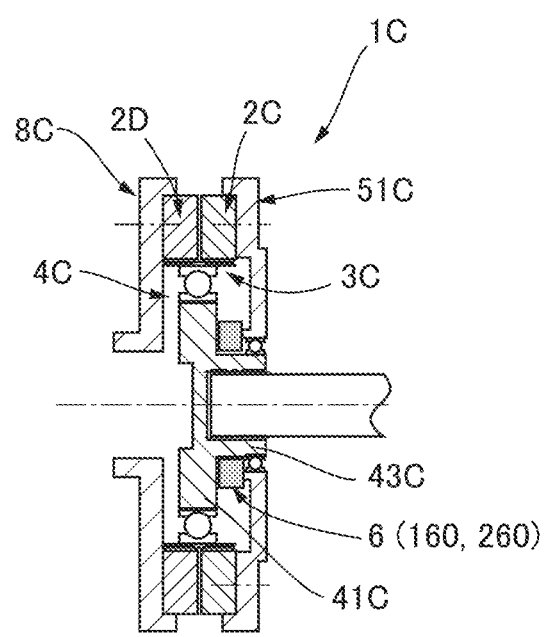
FIG. 6 is a diagram showing an example of a pancake-shaped strain wave gearing to which the present invention is applied.

FIG. 6 shows a pancake-shaped strain wave gearing 1C into which a detection mechanism is incorporated. The pancake-shaped strain wave gearing 1C has: a rigid internally toothed gear 2C; a flexible externally toothed gear 3C that is coaxially disposed inside the internally toothed gear 2C; a wave generator 4C that is disposed coaxially inside the externally toothed gear 3C, the wave generator 4C causing the externally toothed gear 3C to flex into a non-circular shape and partially mesh with the internally toothed gear 2C; an input-side housing 51C (device housing); and a detection mechanism 6 (160, 260) that detects a miniscule degree of displacement of the wave generator 4C in the direction of an axis, the miniscule degree of displacement being caused by thrust generated between the wave generator 4C and the externally toothed gear 3C.

The strain wave gearing 1C also comprises a rigid drive-side internally toothed gear 2D that is coaxially disposed in alignment with the internally toothed gear 2C in the direction of the axis. A disc-shaped output shaft 8C is coaxially fixed to the drive-side internally toothed gear 2D. The externally toothed gear 3C, which is caused to flex into a non-circular shape by the wave generator 4C, partially meshes with the drive-side internally toothed gear 2D as well. The externally toothed gear 3C is provided with a cylindrical barrel part that is capable of flexing in the radial direction, and external teeth are formed on an outer peripheral surface of the cylindrical barrel part. The internally toothed gear 2C has a different number of teeth than the externally toothed gear 3C, and the drive-side internally toothed gear 2D has the same number of teeth as the externally toothed gear 3C so as to rotate integrally with the externally toothed gear 3C. The detection mechanism 6 (160, 260) is incorporated between a hub 43C of a wave plug 41C of the wave generator 4C and the input-side housing 51C, which surrounds the hub 43C.

The invention claimed is:

1. A strain wave gearing comprising:
   a rigid internally toothed gear;
   a flexible externally toothed gear that is disposed inside the internally toothed gear;
   a wave generator that is disposed inside the externally toothed gear, the wave generator causing the externally toothed gear to flex into a non-circular shape and partially mesh with the internally toothed gear;
   a device housing that rotatably supports the wave generator; and
   a detection mechanism that, in order to calculate thrust generated between the wave generator and the externally toothed gear, detects displacement produced in the wave generator in the direction of an axis by the thrust,
   wherein
   the wave generator is provided with a cylindrical hub that is linked to an external rotating shaft so as to rotate integrally with the rotating shaft while being capable of moving relatively in the direction of the axis,
   the device housing is provided with a cylindrical housing portion that surrounds the hub, and
   the detection mechanism is disposed between the hub and the cylindrical housing and detects the displacement produced in the hub in the direction of the axis.

2. The strain wave gearing according to claim 1,
   wherein
   the wave generator is provided with a rigid wave plug provided with a non-circular outer peripheral surface;
   the hub is formed integrally with or fixed to one plug end surface of the wave plug in the direction of the axis;
   the detection mechanism is provided with a laser light source, a reflection part that reflects laser light from the laser light source, and a light-receiving part that receives the laser light reflected by the reflection part;
   a detection unit, which is provided with the laser light source and the light-receiving part, is attached to the device housing; and
   the reflection part is provided to the plug end surface.

3. The strain wave gearing according to claim 2,
   wherein
   the reflection part is provided with a ring-shaped reflective surface that is centered on the axis on the plug end surface; and
   at least a pair of the detection units are provided, the detection units being disposed at symmetrical angular positions that are offset by 180 degrees centered on the axis.

4. The strain wave gearing according to claim 1,
   wherein the detection mechanism is provided with:

a detection pattern that is disposed on an outer peripheral surface of the hub, the detection pattern being capable of expanding and contracting in a manner that follows displacement of the hub in the direction of the axis; and a detection unit that is attached to the device housing, the detection unit optically or magnetically detecting expansion and contraction of the detection pattern.

5. The strain wave gearing according to claim 4, wherein the detection pattern includes light-reflective parts and non-reflective parts that are formed alternatingly at regular intervals along the direction of the axis; and the detection unit is an optical detection unit provided with a fixed slit plate in which are formed light-transmitting parts that are formed at regular intervals along the direction of the axis, a light-emitting part that emits detection light toward the detection pattern via the light-transmitting parts, and a light-receiving part that receives, via the light-transmitting parts, the detection light reflected by the reflection part.

6. The strain wave gearing according to claim 5, wherein at least a pair of the detection units are provided, the detection units being disposed at symmetrical angular positions that are offset by 180 degrees centered on the axis.

7. The strain wave gearing according to claim 6, wherein the detection pattern is formed over the entire circumference of the hub, and the detection units are provided with a ring-shaped light-emitting part and a ring-shaped light-receiving part that coaxially surround the detection pattern.

8. The strain wave gearing according to claim 5, wherein the detection pattern is formed directly on the outer peripheral surface of the hub, or is formed on a film that is affixed to the outer peripheral surface of the hub.

9. The strain wave gearing according to claim 4, wherein the detection pattern includes magnetic parts and non-magnetic parts that are formed alternatingly at regular intervals along the direction of the axis; and the detection unit is a magnetic detection unit provided with magnets that face the detection pattern such that the intensity of a magnetic field changes in association with expansion and contraction of the detection pattern in the direction of the axis, and a magnetic detection element that detects any change in the intensity of the magnetic field.

10. The strain wave gearing according to claim 9, wherein at least a pair of the detection units are provided, the detection units being disposed at symmetrical angular positions that are offset by 180 degrees centered on the axis.

11. The strain wave gearing according to claim 9, wherein the detection pattern is formed over the entire circumference of the hub, and the detection unit is provided with a ring-shaped magnet and a ring-shaped magnetic detection element that coaxially surround the detection pattern.

12. The strain wave gearing according to claim 9, wherein the detection pattern is formed directly on the outer peripheral surface of the hub, or is formed on a film that is affixed to the outer peripheral surface of the hub.

13. The strain wave gearing according to claim 1, further comprising:

a temperature sensor for performing temperature correction for the displacement detected by the detection mechanism, the temperature sensor being disposed near the hub.

14. The strain wave gearing according to claim 1, furthermore comprising:

a calculation unit that calculates at least one of whether or not thrust has been generated, the direction of the thrust, the magnitude of the thrust, and any change over time in the thrust on the basis of the detection result from the detection mechanism; and an operation state determination unit that determines the operation state of the strain wave gearing on the basis of the calculation result from the calculation unit.

15. The strain wave gearing according to claim 14, furthermore comprising:

an operation control unit that performs operation control for the strain wave gearing on the basis of the detection result from the detection mechanism or the determination result from the operation state determination unit.

16. An actuator comprising:

the strain wave gearing according to claim 15, and a motor in which a motor shaft is linked to the hub of the wave generator, wherein the operation control unit controlling rotation inputted from the motor to the strain wave gearing to thereby perform the operation control for the strain wave gearing.

17. The actuator according to claim 16, furthermore comprising:

a brake mechanism that controls the rotation inputted to the strain wave gearing, wherein the operation control unit controls the brake mechanism to thereby perform the operation control for the strain wave gearing.

* * * * *